(12) United States Patent
Nelson

(10) Patent No.: US 6,518,685 B2
(45) Date of Patent: Feb. 11, 2003

(54) MULTI-POSITION ACTUATOR OR SECTOR MOTOR

(76) Inventor: Victor Nelson, 8 Midvale Ct., East Northport, NY (US) 11731

( * ) Notice: Subject to any disclaimer, the term of this patent is extended or adjusted under 35 U.S.C. 154(b) by 0 days.

(21) Appl. No.: 09/759,052

(22) Filed: Jan. 12, 2001

(65) Prior Publication Data

US 2002/0093265 A1 Jul. 18, 2002

(51) Int. Cl.[7] ................................................. A41F 19/00
(52) U.S. Cl. ..................... 310/191; 310/37; 310/103; 310/156.01
(58) Field of Search ..................... 310/156.46, 254, 310/66, 191, 92, 209, 103, 154.01, 216, 36, 46, 37, 152, 38, 156.01, 192, 261; 335/253, 254

(56) References Cited

U.S. PATENT DOCUMENTS

| | | | | |
|---|---|---|---|---|
| 575,210 A | * | 1/1897 | Campbell | 310/191 |
| 597,418 A | * | 1/1898 | Johnson | 388/835 |
| 2,625,674 A | * | 1/1953 | Petit | 322/25 |
| 3,014,143 A | * | 12/1961 | Tardel | 310/191 |
| 4,500,861 A | * | 2/1985 | Nelson | 335/253 |
| 4,662,644 A | | 5/1987 | Nelson | 280/214 |
| 4,795,929 A | * | 1/1989 | Elgass et al. | 310/36 |
| 5,742,106 A | * | 4/1998 | Muraji | 310/36 |
| 5,819,583 A | * | 10/1998 | Matsushima et al. | 74/7 E |
| 5,990,592 A | * | 11/1999 | Miura et al. | 310/156.53 |

* cited by examiner

Primary Examiner—Nestor Ramirez
Assistant Examiner—Guillermo Perez
(74) Attorney, Agent, or Firm—Collard & Roe, P.C.

(57) ABSTRACT

A multi-position actuator with three electromagnetic poles where the airgap of selected pole(s) is made different from the remaining pole(s). The multi-position actuator comprises a housing, an armature rotatably mounted in the housing, and three poles journaled around the armature. There is also a stop arm attached to the armature which stops the rotation of the armature when the stop arm hits an adjacent stop. These stops are positioned within the housing to limit the rotation of the armature. This multi-position actuator is designed to form either a fail safe actuator or a latching actuator by adjusting the spacing of the air gap between the poles and the armature. When used with continuous rotation without the stop mechanism, the air gap(s) of the pole(s) can be adjusted in a repetitive manner to produce a useful magnetic torque.

18 Claims, 6 Drawing Sheets

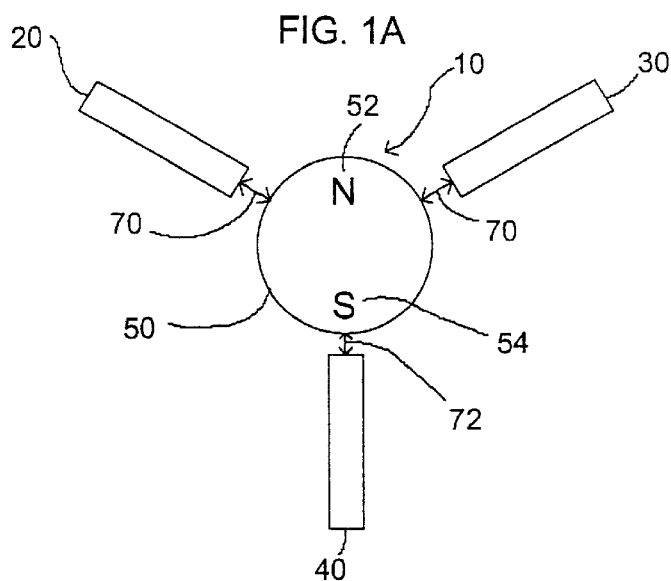
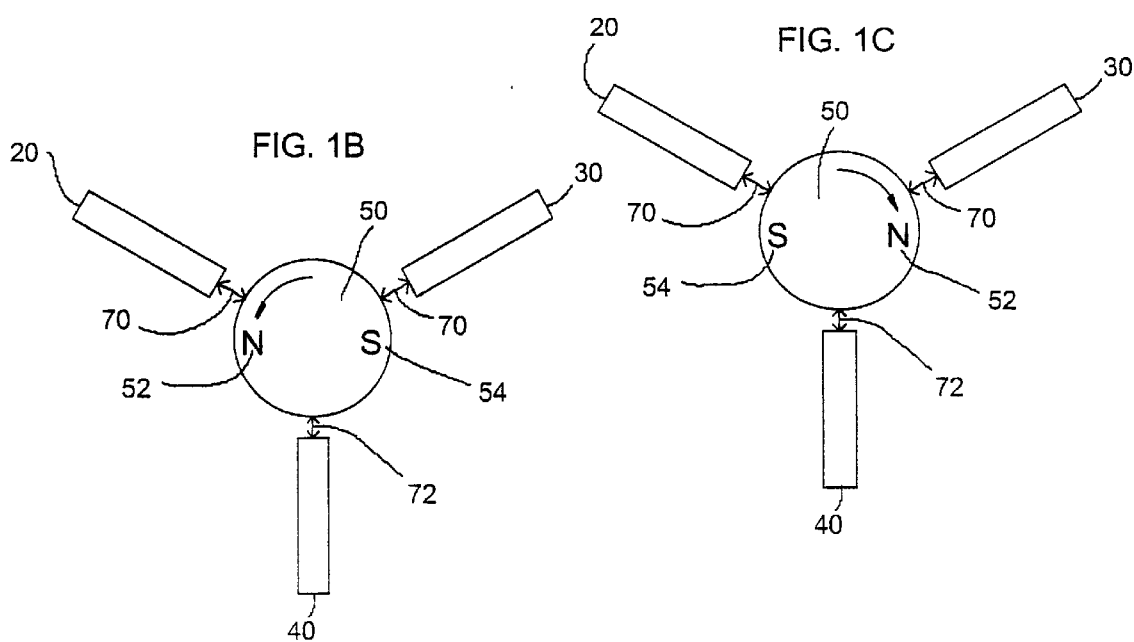

US 6,518,685 B2

MULTI-POSITION ACTUATOR OR SECTOR MOTOR

BACKGROUND OF THE INVENTION

FIELD OF THE INVENTION

The present invention relates to actuators, which may be used over a limited range or in a continuous direction where the desired result is obtained by varying a gap between a fixed stator pole and the permanent magnet rotatable armature. The proposed actuator can be used as a sector motor for devices that require two or three different positions in either a failsafe or a latching configuration or as in a continuous rotating device, which provides additional rotational energy to that device.

SUMMARY OF THE INVENTION

The invention relates to a multi-position or continuously rotating actuator, which includes stationary multi-pole (poles) journaled around a rotatable permanent magnet. Essentially, the design of this actuator includes at least two substantially similar poles positioned around an armature and a third pole. The third pole can either be preset at a specific gap distance for a limited range actuator or set to vary at set armature angles for a continuous rotating device. There is an air gap between each of the poles and the rotatable magnet wherein each air gap is set at a distance to produce the desired drive characteristics. Where this device relies on the principle that any freely rotatable magnet will seek or try to seek a position of maximum flux. Thus, with this design, the rotation characteristics of the armature within the housing are dependent upon the differential size of the air gaps between the poles and the armature.

With the design of the limited range multi-position actuator, there are a series of suitable mechanical stops that will limit the operating range to less than 180 degrees. The third pole can be adjusted to create either a failsafe mechanism or a latching mechanism. For the failsafe application, when the third pole is set closer to the armature, the rotatable magnet armature will always seek this mid position when electrical power is removed. Thus, when applying power to either of the first two poles, the armature will rotate to match the poles on the armature to these first two poles. When this power is removed, the magnet rotates back to its mid range fail safe position.

For the latching mechanism, the mid-pole gap is pre-set further away from the armature when compared to the adjacent poles resulting in the armature being stable or latched to either of the two stops since maximum flux occurs at this angle limited by the stops. When powered, this device becomes a simple two position actuator where the latching force is controlled by the gap setting. For a three-position actuator, the mid position will be obtained by using an auxiliary device such as a helper magnet or a spring detent.

For a continuous rotating actuator, the gap distance of the third pole can be varied by using an auxiliary means. Essentially, this gap distance can be made to vary from way out to close in once or twice for each armature cycle for a three-pole device. When timed properly, with the third pole effectively out, forming a large gap, the rotating armature will contribute energy to an attached rotating device by trying to seek a position of maximum flux. When the pole is totally in, forming a tight gap, the armature is effectively balanced and will be in a free wheeling mode. An obvious application for this invention is for a bicycle. If the sprocket hub contains the three-pole device and the rotating sprocket shaft contains the permanent magnet, then a hand linkage could be used to move this third pole in rhythm with the action of the feet pressing on the pedals creating an added energy pulse.

Letting go of this linkage will automatically result in the pole being driven to its tight gap stop. The use of a similar design is shown in U.S. Pat. No. 4,662,644 to Nelson, which is incorporated herein by reference.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 1A shows a simplified view of the adjustable pole continuous rotation armature wherein the poles are all spaced an equal distance apart from the armature;

FIG. 1B shows the actuator of FIG. 1A, wherein the armature rotate in a counterclockwise direction;

FIG. 1C shows the actuator of FIG. 1A wherein the armature rotates in a clockwise direction;

DETAILED DESCRIPTION OF PREFERRED EMBODIMENTS

Figure 2A:
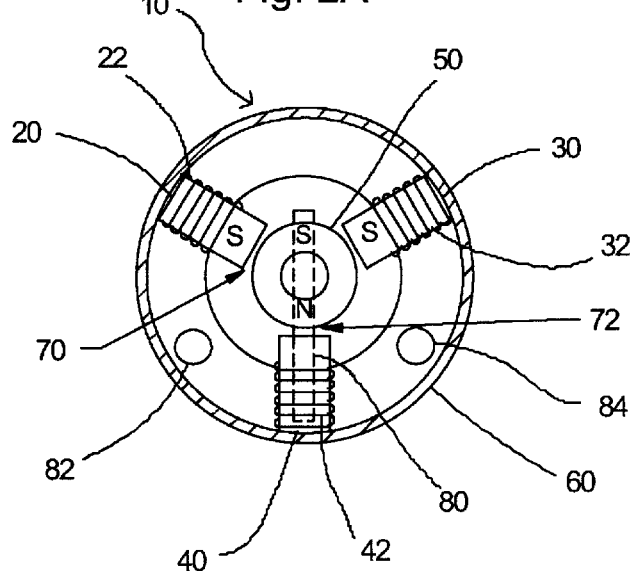
FIG. 2A shows a latching actuator in its middle position.

Referring in detail to the drawings, FIGS. 1A, 1B and 1C show a simplified schematic diagram of actuator 10 wherein there are shown poles 20, 30 and 40 positioned around an armature 50. Surrounding poles 20, 30, 40 and armature 50 is a soft iron shell 60 (SEE FIGS. 2A–3C). Poles 20, 30 and 40 are made from a magnetic material such as iron, and their distance from armature 50 is preset or can be adjusted by using a series of adjustment shims (not shown) positioned at the rear portion of the poles, or by providing a hand linkage that adjusts the distance of these pole gaps.

As shown in FIGS. 1A, 1B, and 1C, the spacing of air gap 70 between pole 40 and armature 50 equals the spacing of air gaps 72 between poles 20 and 30 and armature 50. With this design, armature 50 is essentially free-wheeling, with no attraction to any pole. Thus, all flux paths are balanced in this situation.

Figure 2B:
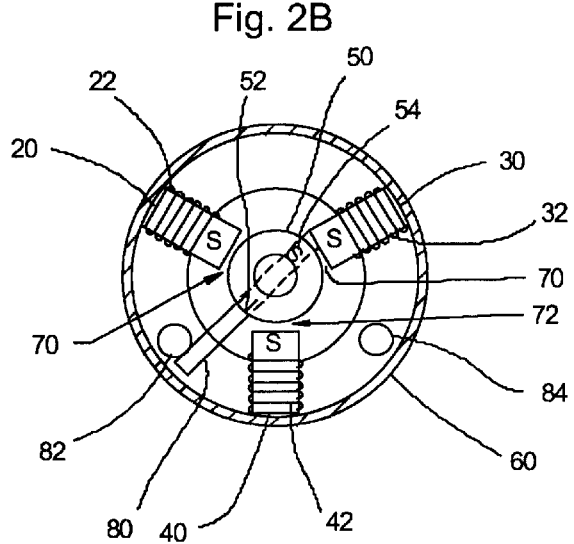
FIG. 2B shows the latching actuator of FIG. 2A in a first latched position.
Figure 2C:
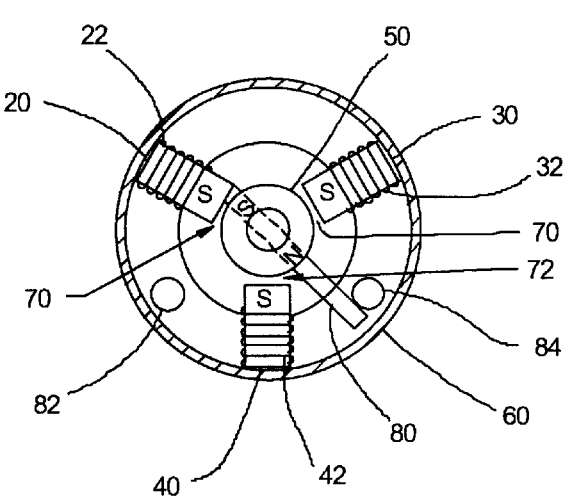
FIG. 2C shows the latching actuator of FIG. 2A in a second latched position.

FIGS. 2A, 2B and 2C show a first embodiment for the limited range actuator, which is a latching version of the actuator 10. Each of these poles 20, 30 and 40 have a series of windings 22, 32 and 42 respectively. When power is applied to windings 22, 32, and 42, each of these windings along with poles 20, 30, and 40 create a magnetic flux that acts upon armature 50. Armature 50 is essentially a two-pole rotatable magnet in the form of a shaft that is supported by ball-bearings, and connected to a drive (see FIG. 5). Armature 50 may be rotated based on a magnetic flux applied to armature 50 by poles 20, 30 and 40 surrounding armature 50.

These preset poles or stators are journaled around rotatable armature 50. Rotatable armature 50 is a permanent magnet that has a north pole 52 and a south pole 54. Essentially, this multi position actuator is rotatable about an axis when poles 20, 30 and 40 are charged. The magnetic torque acting on armature 50 is developed from the differential size of the air gaps between poles 20, 30 and 40 and armature 50.

Figure 4:
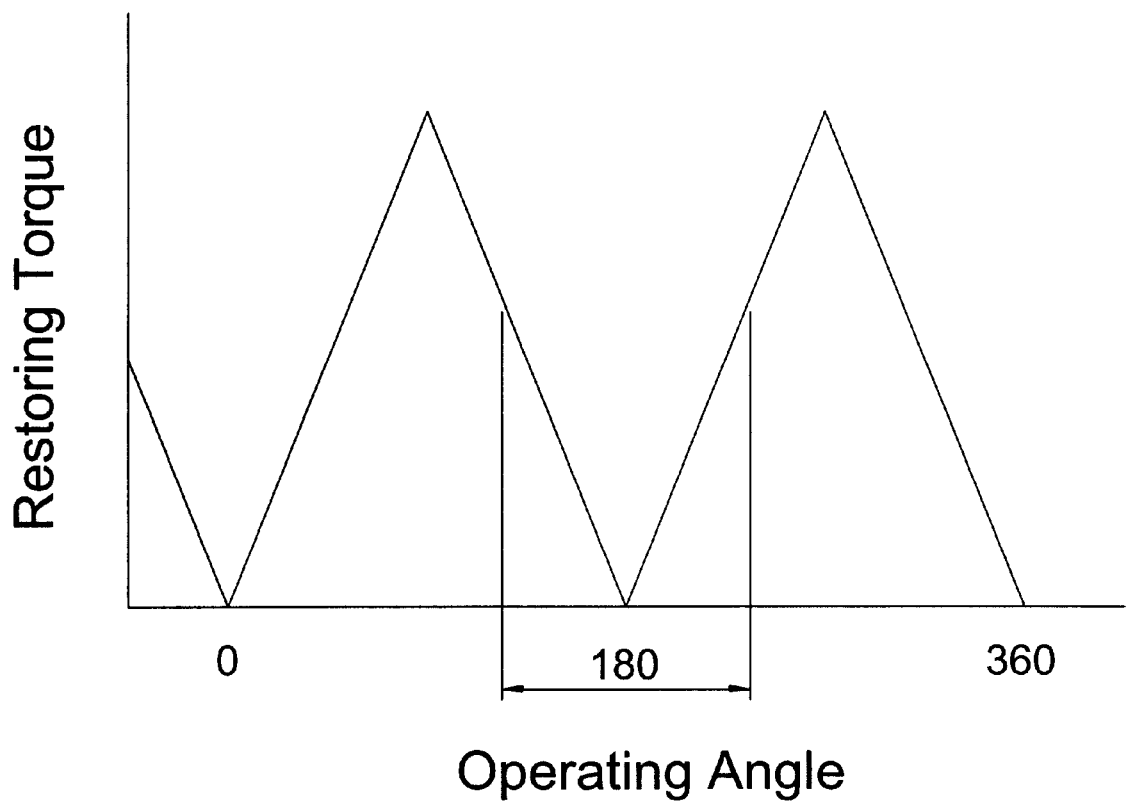
FIG. 4 shows a plot of a graph showing the rotational torque plotted against the operating angle of the actuator for a failsafe arrangement.

With this design, poles 20 and 30 are positioned closer to armature 50 than pole 40. Thus, the spacing of air gaps 70 are less than the spacing of air gap 72. With this embodiment, the typical size of air gap 70 between poles 20 and 30 and armature 50 is 0.015 inches, while the typical size of air gap 72 between pole 40 and armature 50 is 0.05 inches. In the latched design, shown in FIGS. 2A, 2B, and 2C, there is no required holding D.C. current for armature 50 to remain in a latched position. As shown in FIGS. 2B and 2C, the rotation of armature 50 is limited by a stop arm 80 which rotates into a series of stops 82 and 84. With this design, armature 50 can only rotate across a limited range as shown in FIG. 4 when poles 20, 30, and 40 are charged and uncharged. With this latching embodiment, once stop arm 80 contacts either stop pole 82 or 84, armature 50 remains in that position via because of the magnetic torque developed by the different pole gaps causing the armature to try to seek a position of maximum flux. The middle position 2B becomes a latching position because of the auxiliary magnet or detent arrangement.

Figure 3A:
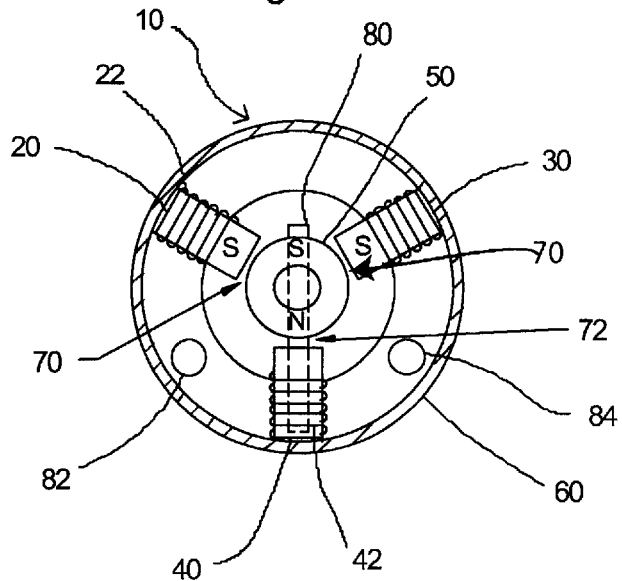
FIG. 3A shows a fail-safe actuator in a fail-safe position.
Figure 3B:
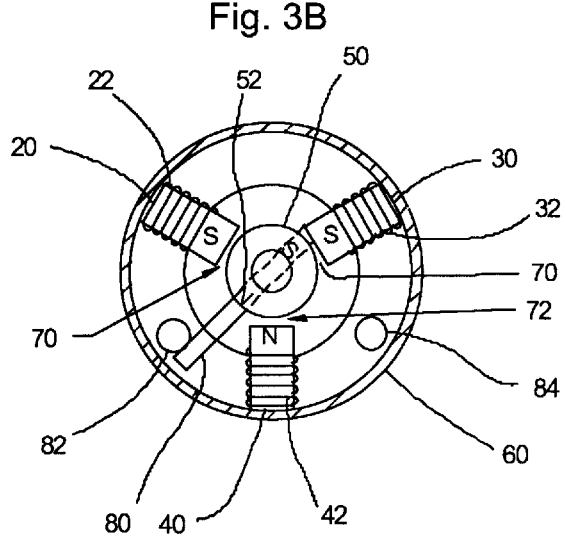
FIG. 3B shows a fail-safe actuator in a second position.
Figure 3C:
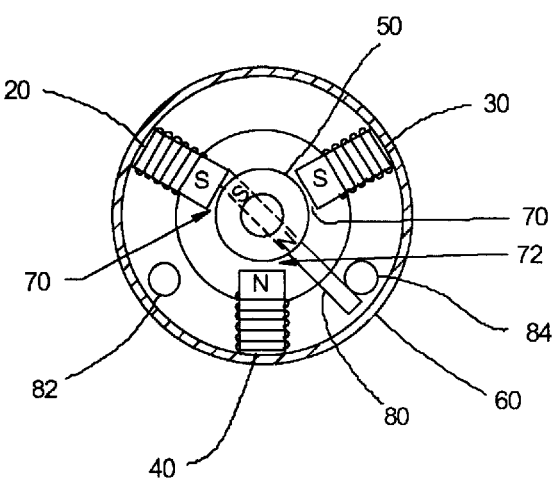
FIG. 3C shows a fail-safe actuator in a third position.

FIGS. 3A, 3B, and 3C show the fail-safe embodiment of the invention. Here, there is shown a series of poles 20, 30, and 40, each having windings 22, 32, and 42. Pole 40 is positioned closer to armature 50 than poles 20 and 30. Thus, the spacing of air gap 72 is less than the spacing of air gaps 70. With this design, a D.C. current is required to hold armature 50 in the positions shown in FIGS. 3B and 3C. These positions are shown whereby in FIG. 3B, stop arm 80 is positioned adjacent to stop 82, while in FIG. 3C, stop arm 80 is positioned adjacent to stop 84. However, when power is removed from poles 20, 30, and 40, armature 50 returns to its original position shown in FIG. 3A, wherein stop arm 80 is positioned between stops 82 and 84, due to the armature seeking a position of maximum flux.

Thus for the three position failsafe device, the angular positions may be 45 degree increments where the end positions are spaced at 90 degrees and defined by two hard stops, shown in FIGS. 2A–3C and the middle position by the inherent magnetic restoring torque to the close gap pole.

The failsafe type described may also be converted into a latching type by adding a suitable auxiliary device to secure the rotating actuator to the end stops. The auxiliary device may be simply a magnet at the end stops attracting a magnet located on the movable load of sufficient attractive force to overcome the restoring force inherent in the actuator and therefore securing the rotating load against the stop.

Figure 5:
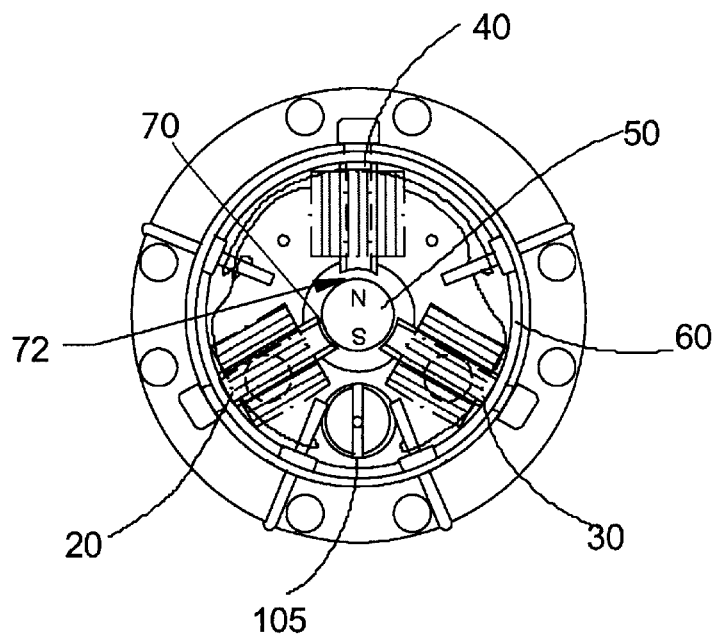
FIG. 5 shows a top view of the multi position device.
Figure 6:
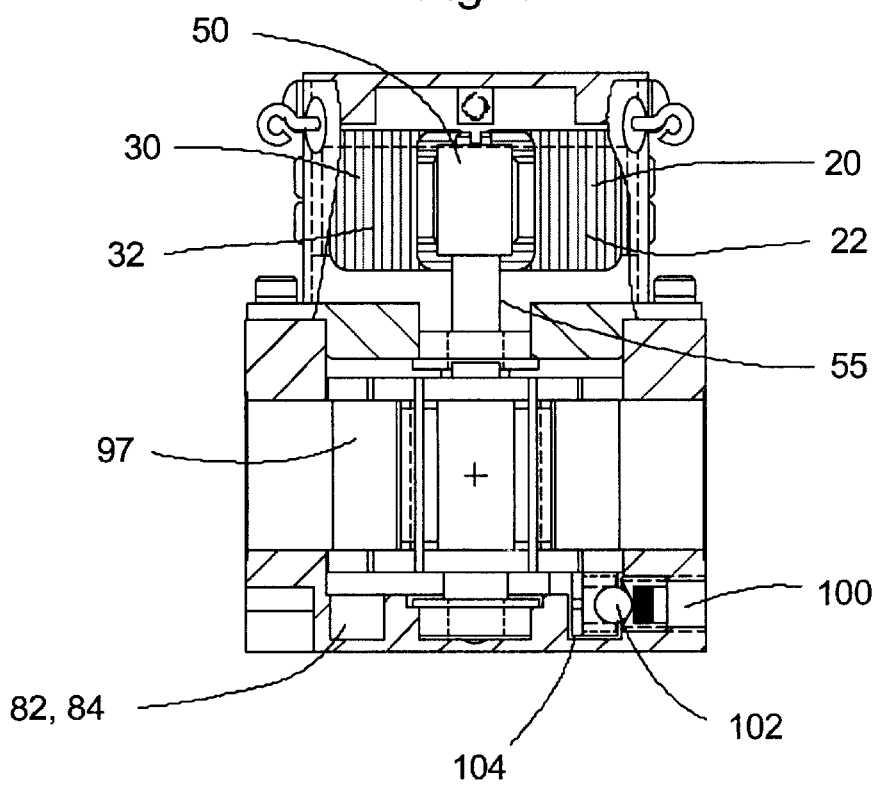
FIG. 6 shows a side view of the multi-position device.

FIGS. 5 and 6 show a cross-sectional view of a complete latching, three-position assembly including the actuator and a typical load arrangement. Armature 50, connected to shaft 55, drives load 97 to any one of three positions. Essentially there are two end positions and a middle position with the end positions defined by stops 82 and 84 and the middle position by means of an auxiliary latching device 105. The actuator consists of two end poles 20 and 30 with close gaps that provide the latching torque at the stops and a third pole 40. The third pole 40 provides an electrical means 42 to drive the load to the middle position where the load is indexed and latched by the auxiliary device 105 and the ball detent 100.

The middle position auxiliary switching device consists of a stationary magnet 105 which will be attracted to a magnet 110 located on the rotating load 97. The rotating load magnet when driven under the stationary magnet 110 will result in an attractive force between the two magnets producing a suitable latching capability for the middle position.

With the latching version, there is also included a detent 100 included with the rotating load 97 designed to reduce the inherent overshooting or quivering of the load when driven to the middle position. Detent 100 includes a spring loaded or magnetically attractive ball 102, which reacts to a stationary detent-magnet 100 to index and secure the load until electrically commanded to switch to another position.

All magnets described herein can be neodymium, alnico, samarium cobalt or any other high energy permanent magnets.

In a continuous rotating device, the armature magnet will rotate to seek a position of maximum flux. Once reaching this position of maximum flux, the armature will resist moving away because of its inherent restoring torque.

Figure 7A:
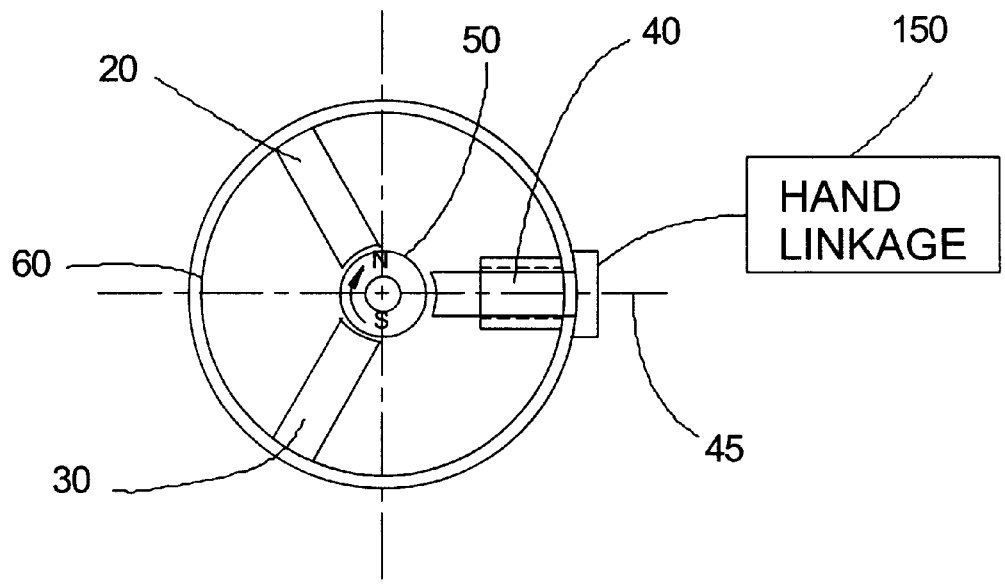
FIG. 7A shows the third pole connected to a hand linkage.
Figure 7B:
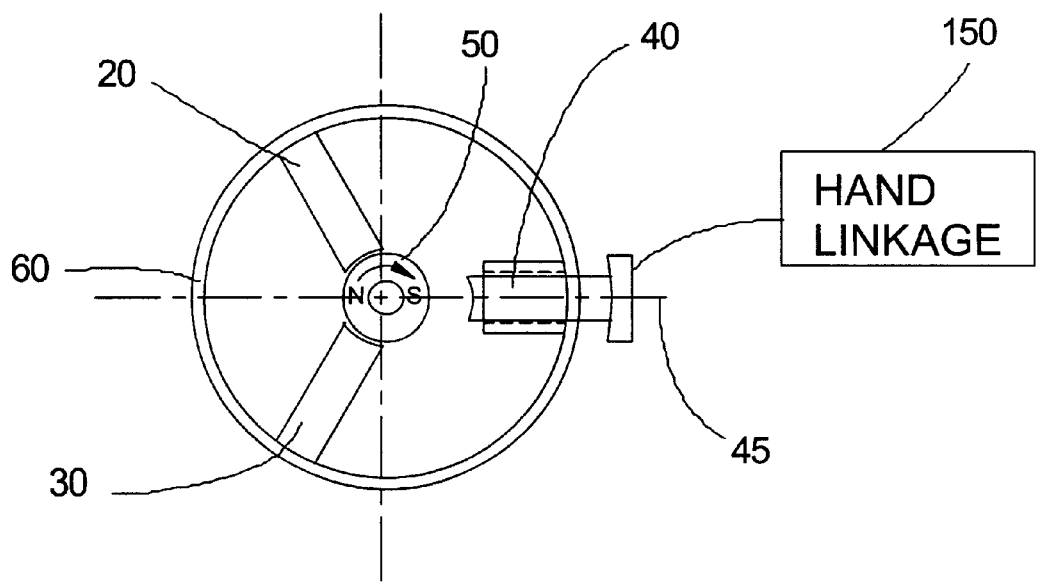
FIG. 7B shows the arrangement of FIG. 7A with the third pole pulled out.

FIGS. 7A and 7B presents a view of a device that eliminates or reduces this inherent restoring force to instead provide a device that produces positive energy pulses over two 90 degree intervals during each revolution which results in a total rotation of 180 degrees. In addition, this device presents a suitable linkage in the form of a hand linkage 150 to eliminate the negative energy required to overcome the restoring torque for the other two 90-degree intervals for each revolution. To achieve this result there is provided a three pole device having poles 20, 30 and 40, and an armature 50 housed in a soft iron shell 60. These poles have equal pole gaps during the 90 degree intervals which are consistent with the restoring force or negative energy which results in free wheeling or zero restoring force. There is also provided a sufficient gap for the third pole during the 90-degree intervals allowing the armature to rotate to a position of maximum flux, thereby contributing to positive energy. With this design, hand linkage 150 controls the axial movement of pole 40 along axis 45 from an inner position show in FIG. 7A, to an outer position shown in FIG. 7B.

This type invention can be used with a bicycle, wherein a bicycle sprocket which has a hand linkage can produce the gap as required and upon releasing the linkage, therefore, all gaps would become equal, having no effect on the bicycle rotation.

This principle of gap programming can apply to more than three poles. In addition, the armature magnet can be multi-poled, consisting of more than one north pole, and one south pole. Also, one can invert the arrangement where the armature can be soft iron poles and be stationary and the housing consist of arc magnets and rotate about the stationary armature where the gaps can be varied to produce the desired results.

Accordingly, while a few embodiments of the present invention have been shown and described, it is to be understood that many changes and modifications may be made thereunto without departing from the spirit and scope of the invention as defined in the appended claims.

What is claimed is:

1. A multi position actuator consisting of:

a housing;

a rotatable armature containing a permanent magnet having radially north and south poles and disposed within said housing;

three electro-magnetic poles disposed within said housing, journaled around said armature wherein at least one of said three electro-magnetic poles is designed to be spaced differently from said armature than the remaining two poles to produce an airgap different than the spacing or airgap from said armature for the remaining two electro-magnetic poles at least one stop coupled to said housing and disposed adjacent to said rotatable armature; and at least one stop arm coupled to said rotatable armature so that said stop arm interacts with said at least one stop to limit a rotation of said armature.

2. The actuator as in claim 1, wherein said housing is designed as a soft iron shell.

3. The actuator as in claim 1, wherein said housing is substantially cylindrical in shape.

4. The actuator as in claim 1, wherein each of said three electro-magnetic poles further comprises a series of windings.

5. The actuator as in claim 4, further comprising a series of screws for coupling each of said three electro-magnetic poles to said housing so that said three electro-magnetic poles can be adjusted to change a spacing or air gap between said poles and said armature.

6. The actuator as in claim 4, wherein the armature is designed as a latching armature, wherein said armature rotates from first position to a second position when current is applied to said series of windings and said armature remains in said second position when said current is removed from said series of windings.

7. The actuator as in claim 1, wherein said three electro-magnetic poles each comprise an adjustable end wherein said adjustable end can be either extended out to position each of said poles closer to said armature or driven in to position each of said poles farther away from said armature.

8. The actuator as in claim 7, wherein said armature is designed as a fail-safe armature, wherein said three electro-magnetic poles include at least one of said three poles positioned closer to said armature than the other two poles wherein said armature rests in a first position due to said close pole, and wherein said armature moves from said first position to a second position or to a third position when a current is applied to a set of windings on said poles, and then said armature rotates back to said first position when said current is removed from said set of windings.

9. The position actuator as in claim 8, further comprising a helper magnet disposed within said housing, wherein said helper magnet is designed apply a magnetic force on said armature to hold said armature in a latched position when current is removed from said windings.

10. The actuator as in claim 9, wherein said helper magnet is made from a component selected from the group consisting of: neodymium, alnico or samarium cobalt.

11. The actuator as in claim 1, wherein said armature is connected to a shaft, disposed within said housing, wherein said shaft is positioned within a set of ball bearings within said housing so that said armature can rotate within said housing.

12. The actuator as in claim 11, wherein said shaft contains a detent designed to receive a magnetically or spring loaded ball bearing as said shaft rotates from a first position to a second position wherein said detent and said magnetically or spring loaded ball bearing are designed to mate, to lock said shaft in a releasable position when power is removed from said windings.

13. The actuator as in claim 1, wherein said shaft is connected to a load at an end opposite said armature.

14. The actuator as in claim 1, wherein at least one of said three electromagnetic poles is closer to said armature than at least one remaining pole of said three electro-magnetic poles.

15. The actuator as in claim 1, wherein at least two of said three electro-magnetic poles are closer to said armature than at least one remaining pole of said three electromagnetic poles.

16. The actuator as in claim 1, wherein at least one of said three electromagnetic poles is farther away from said armature than at least one remaining pole of said three electro-magnetic poles.

17. The actuator as in claim 1, wherein at least two of said three electromagnetic poles is farther away from said armature than at least one remaining pole of said three electro-magnetic poles.

18. The actuator as in claim 1, wherein said armature is made from a component selected from the group consisting of: neodymium, alnico, or samarium cobalt.

* * * * *